United States Patent [19]

Brehm et al.

[11] 4,202,730
[45] May 13, 1980

[54] RADIONUCLIDE DEPOSITION CONTROL

[75] Inventors: William F. Brehm; Joseph C. McGuire, both of Richland, Wash.

[73] Assignee: The United States of America as represented by the Department of Energy, Washington, D.C.

[21] Appl. No.: 760,302

[22] Filed: Jan. 18, 1977

[51] Int. Cl.² .......................................... G21C 15/00
[52] U.S. Cl. ........................................ 176/37; 176/68
[58] Field of Search .................. 176/37, 38, 40, 87, 176/92 R, 68, 91 R, 67, 88, 91; 210/24, 27, 38 C

[56] References Cited

U.S. PATENT DOCUMENTS

| T920,001 | 3/1974 | Cooper | 176/37 |
| 3,024,181 | 3/1962 | Howard et al. | 176/91 R |
| 3,494,805 | 2/1970 | Wang | 176/92 R |
| 3,660,231 | 5/1972 | Fox et al. | 176/86 R |
| 3,693,959 | 9/1972 | Swinhoe et al. | 176/37 |
| 3,826,754 | 7/1974 | Grossman et al. | 252/301.1 R |
| 3,969,185 | 7/1976 | Ross et al. | 176/68 |
| 4,050,985 | 9/1977 | Yant et al. | 176/37 |

OTHER PUBLICATIONS

Nuclear Technology, vol. 12, No. 2, (10/71), pp. 218-225, Vissers et al.
Yevick et al., "Fast Reactor Technology: Plant Design", 1966, pp. 677-680, 698-703.

Primary Examiner—Stephen C. Bentley
Assistant Examiner—S. A. Cangialosi
Attorney, Agent, or Firm—R. V. Lupo; Richard E. Constant; Ignacio Resendez

[57] ABSTRACT

The deposition of radionuclides manganese-54, cobalt-58 and cobalt-60 from liquid sodium coolant is controlled by providing surfaces of nickel or high nickel alloys to extract the radionuclides from the liquid sodium, and by providing surfaces of tungsten, molybdenum or tantalum to prevent or retard radionuclide deposition.

13 Claims, 7 Drawing Figures

RADIONUCLIDE DEPOSITION CONTROL

The invention was made in the course of, or under, a contract with the Energy Research and Development Administration.

BACKGROUND OF INVENTION

The invention relates to the use of specific materials to control the deposition or non-deposition of radionuclides of cobalt and manganese from liquid sodium.

The sodium coolant for sodium cooled fast breeder reactors becomes a carrier of radioactive isotopes which may be high temperature corrosion products, or neutron irradiation products, or the like from the various components that are in contact with the liquid sodium. The activity resulting from the corrosion product transport and subsequent deposition on primary heat transport system surfaces is a serious problem that limits access time for maintenance of system components such as pumps, pump shafts, intermediate heat exchangers, valves, flow and temperature sensors, etc. This problem may be of a more serious nature, if, during operation of the liquid metal fast breeder reactor, fuel failure occurs so that the problem is intensified due to possible fission product release.

The radionuclides that present the greatest problem include manganese-54 ($^{54}$Mn), cobalt-58 ($^{58}$Co) and cobalt-60 ($^{60}$Co). While other radionuclides may also be present and may also limit access time for maintenance purposes, the present invention is directed to the above cited specific radionuclides.

It would be desirable to eliminate or reduce the problem of radionuclide concentration in areas where maintenance of system components is required and it would likewise be desirable to control the areas in which this radionuclide deposition takes place or does not take place.

SUMMARY OF INVENTION

In view of the above limitations and goals, it is an object of this invention to provide a process for controlling the deposition or non-deposition of specific radionuclides from liquid sodium.

It is a further object of this invention to provide a process for chemically separating radionuclides manganese-54, cobalt-58 and cobalt-60 from a liquid coolant.

It is a further object of this invention to provide for the removal of radionuclides from liquid sodium at various temperatures.

It is a further object of this invention to provide an apparatus that has at least 75 percent efficiency in removing manganese-54 and cobalt-58 and cobalt-60 radionuclides from flowing molten sodium.

It is a further object of this invention to overcome prior art limitations by providing surfaces onto which said radionuclides will not deposit.

It is a further object of this invention to provide an apparatus that has at least 75 percent efficiency in inhibiting or preventing the deposition of manganese-54, cobalt-58 and cobalt-60 radionuclides from flowing molten sodium.

It is a further object of this invention to provide a liquid sodium cooled fast breeder reactor system wherein the sodium coolant system components do not have the radioactivity derived from manganese-54, cobalt-58 and cobalt-60 which would otherwise limit access time for maintenance of the system components.

It is a further object of this invention to provide a novel trap configuration for removing radionuclides from liquid sodium.

It is a further object of this invention to provide a novel trap location for removing radionuclides from liquid reactor coolants.

Various other objects and advantages will appear from the following description of this invention and the most novel features will be particularly pointed out hereinafter in connection with the appended claims. It will be understood that various changes in the details, materials, and layout of the apparatus and process which are herein described and illustrated in order to explain the nature of the invention may be effected by those skilled in the art without departing from the scope of this invention.

The invention comprises controlling the deposition of radionuclides manganese-54, cobalt-58, and cobalt-60 from liquid reactor coolants such as liquid sodium by positioning a high surface area material of nickel or a high nickel content alloy in a flow of sodium containing manganese-54, cobalt-58 and cobalt-60 to effect deposition of the radionuclides on the materials, and subsequently separating the radionuclide loaded material from the sodium stream; and positioning components where deposition is undesirable having surface areas made of tungsten, molybdenum or tantalum in those areas where the liquid sodium flow is contacted. The high surface area material may be in the form of a radionuclide trap comprising an elongated cylindrical core, a nickel sheet of from about 0.13 mm to 0.25 mm thickness having a plurality of diagonal grooves on a face thereof, said sheet of material being wrapped around the elongated cylindrical core to form a plurality of layers of the sheet about the core. The diagonal grooves form long helical passageways for the passage of sodium therethrough and the deposition of the radionuclides on the trap material. The nickel material may be suitably disposed in a housing which may then be located in reactor fuel element subassemblies adjacent to and immediately downstream of the fuel pins.

DETAILED DESCRIPTION

Figure 1:
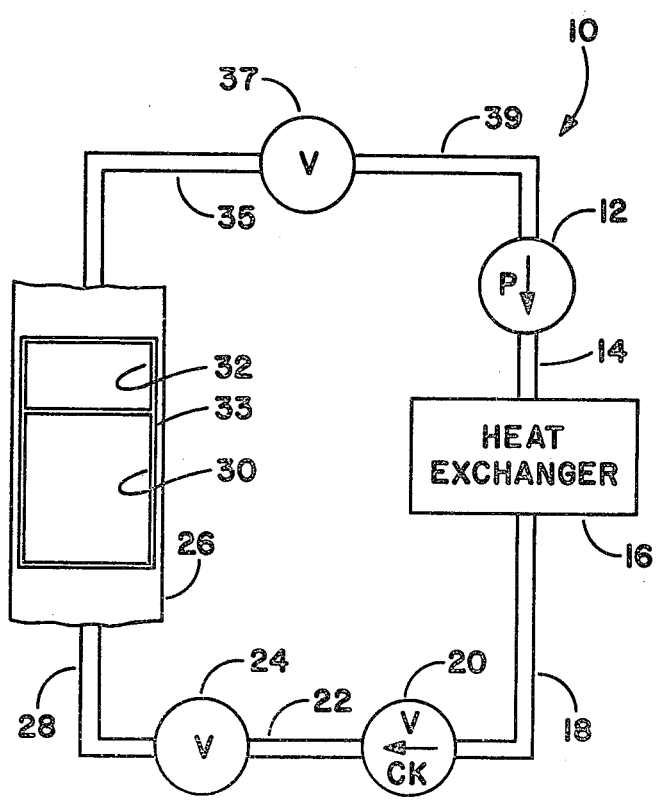
FIG. 1 illustrates a flow sequence or sodium loop for the liquid metal coolant.

As diagrammatically shown in FIG. 1, the liquid sodium coolant flow circuit or loop 10 illustrates that liquid sodium is pumped by means of pump 12 through an appropriate conduit 14 into the liquid sodium coolant system components such as intermediate heat exchanger 16, through conduit 18 into other system components such as check valve 20, and thereafter through an appropriate conduit 22 past isolation valve 24 into the reactor core fuel assembly duct 26 via conduit 28 and past fuel elements 30 to cool and remove heat from a plurality of fuel pins or elements 30 as known in the art. As the liquid sodium is pumped through the circuit, various radionuclides produced by the neutron irradiation are removed from the material that the liquid sodium contacts, and these are carried into the heat transport system piping by the flowing sodium and deposited at various locations which give rise to the problems noted in the Background of Invention.

For example, as the liquid sodium is pumped through the circuit, the various radionuclides may deposit on the pump, valves, etc., and on various other system components such that the radioactivity will build up on each of these components and prevent or limit access time for maintenance.

While liquid sodium cooling systems are discussed herein, this invention is easily applicable to systems using lithium coolants and other like materials as coolants where these radionuclides are generated.

We have discovered that the problems or disadvantages of radionuclide deposition in areas where such deposition is indesirable may be reduced or eliminated by disposing nickel or a high nickel alloy as a "getter" material in the path of the liquid sodium to effect contact of the sodium with the getter material having a high surface area, and subsequent deposition of the various radionuclides on the surface of the getter material. As noted in Table III, high nickel alloys, e.g. those having greater than about 73 weight percent nickel, may be used successfully in this invention although at lower efficiency. For convenience, getter materials are referred to herein as nickel materials. This nickel material may be in the form of a trap 32 schematically shown in FIG. 1, the sodium flow going by the fuel elements 30 into trap 32 and subsequently through a suitable conduit 35 past isolation valve 37 through conduit 39 into pump 12 to again begin the cycle.

It has been found that by disposing the nickel getter material as a trap 32 at a location immediately downstream of and in close proximity to the fuel elements, i.e., in reactor fuel element subassemblies 33 immediately above the fuel pins, the radionuclides may be effectively removed, i.e., at least about 75% removal of the radionuclides maybe effected. The location of the trap in this position removes the radionuclides before they can deposit in areas of the primary heat transport system that may require maintenance. Further, it is desirable that the trap material have a high surface area and that there be a turbulent flow of the sodium through the trap.

We have found that the best getter material for manganese-54 removal is unalloyed nickel. Manganese-54 is the principal radionuclide of concern in the sodium flow circuit, since it is rapidly released and moves readily in sodium to maintenance areas of the circuit. However, it has been found that this nuclide is stable with respect to temperature change once deposited on the surface of one of the more active getters as listed hereinbelow. For example, in direct comparison at high temperature (about 593° C.) nickel takes up ten times as much activity as AISI 304 series stainless steel. Auger electron spectroscopy analysis has shown the manganese-54 activity to have penetrated more than 30,000 angstrons (3 microns) below the nickel surface in 1,000 hours.

In short duration tests (about 100 hours), the cobalt nuclides appeared to move very slowly, either remaining in the source of the nuclides or redepositing almost immediately in the hot zone. Longer duration test (about 21,000 hours) show a slow movement of both cobalt-58 and cobalt-60 toward the colder (about 427° C.) areas of the loop. Present getter runs indicate that nickel is again the best potential getter material for radioactive cobalt nuclides.

In the area of concern for this invention, the radionuclides of greatest concern are the long-lived gamma emitters cobalt-58, cobalt-60 and manganese-54 created by neutron interaction with the constituents of stainless steel. Manganese-54 is leached from the hot stainless steel surfaces by flowing sodium and redeposited in colder areas of the sodium circuit or preferentially in areas of high turbulence such as valve seats, flow meters, and locations where flow direction changes drastically. The deposition is temperature dependent and increases as the sodium is cooled.

The two cobalt nuclides are much less mobile in sodium, either staying in place or being redeposited almost immediately in areas adjacent to the radionuclide source.

We have further discovered that surfaces of these components that are in contact with the liquid sodium may be made from or have a coating of tantalum, tungsten or molybdenum, or combinations thereof, to effectively reduce and inhibit the deposition of the radionuclides onto these surfaces and thereby prevent or inhibit the increased radioactivity from these radionuclides on these components. The coating may be applied through flame spraying or diffusion bonding to a thickness of at least 25 microns. By using tungsten, tantalum or molydbenum, the deposition of radioactive material is minimized in areas of the liquid sodium coolant circuit subject to contact maintenance, since tungsten, tantalum and molybdenum do not collect manganese-54, cobalt-58, cobalt-60 or cesium-137 at 500° C. and above.

Table I illustrates approximate comparative efficiency of various materials for gettering or non-gettering of the specific nuclides at a hot (about 604° C.) and a cold (from about 204° to about 316° C.) temperature. These results are after exposure to a section of about 6.4 mm outer diameter thin wall stainless steel tubing with 20 millicuries of cobalt-60, manganese-54 and cesium-137 activity for a period of 2500 hours at the specific temperature noted. Table II ranks the materials as getters for the three radionuclides present in order of descreasing efficiency.

From the data of these tables, it may readily be seen that nickel is the overall best getter for both manganese and cobalt isotopes in the hot and cold regions. By the same token, tantalum and molybdenum also minimize the amount of deposition of the nuclides in both the hot and cold regions.

Table III illustrates the results of exposure of various alloys to manganese-54 activity, expressed in counts per minute, on 12.7 mm by 25.4 mm by 0.76 mm specimen, for two identical 1,000 hour runs to compare a number of metals and alloys. Again it is noted that tantalum and tungsten are not affected in the hot zone by radioisotope deposition, but the manganese-54 does deposit in the cold zone or in the colder temperatures. From the Table it is also apparent that the high weight percent nickel alloys absorb or have radionuclide deposition that is significantly less than the nickel element by itself, but is still significantly greater than stainless steel structural materials.

Table I

| Material | Hot (604° C.) | | | Cold (260° C.) | | |
|---|---|---|---|---|---|---|
| | $60_{Co}$ | $54_{Mn}$ | $137_{Cs}$ | $60_{Co}$ | $54_{Mn}$ | $137_{Cs}$ |
| Low Carbon Steel | 140 | 29379 | 0 | 363 | 10665 | 981 |
| Ni Felt | 4377 | 29073 | 0 | 1897 | 12728 | 0 |
| Niobium | 437 | 10239 | 0 | 400 | 3921 | 212 |
| Tantalum | 202 | 156 | 0 | 42 | 601 | 147 |
| Cobalt | 351 | 15114 | 0 | 509 | 1920 | 78 |
| Molybdenum | 123 | 101 | 7 | 41 | 1507 | 188 |
| Zirconium | 210 | 990 | 23 | 22 | 3634 | 11322 |
| Titanium | 247 | 7245 | 0 | 233 | 478 | 1902 |
| Stainless Steel | 2168 | 5561 | 0 | 279 | 2301 | 65 |
| Graphite | 406 | 101 | 279 | 70 | 187 | 70782 |

Table II

| | Hot $^{54}$Mn c/m | | Cold $^{54}$Mn c/m | | Cold $^{137}$Cs c/m | | Hot $^{60}$Co c/m | | Cold $^{60}$Co c/m |
|---|---|---|---|---|---|---|---|---|---|
| 1. | Steel$^a$ | 29379 | Ni | 12728 | Graphite | 70762 | Ni | 4377 | Ni | 1897 |
| 2. | Ni | 29073 | Steel$^a$ | 10665 | Zr | 11322 | SS$^b$ | 2168 | CO | 509 |
| 3. | Co | 15114 | Zr | 3634 | Ti | 1902 | Nb | 437 | Nb | 400 |
| 4. | Nb | 10239 | Nb | 2921 | Steel$^a$ | 981 | Graphite | 406 | Steel$^a$ | 363 |
| 5. | SS$^b$ | 5561 | SS$^b$ | 2301 | Nb | 212 | Co | 351 | SS$^b$ | 279 |
| 6. | Zr | 990 | Co | 1920 | Mo | 188 | Ti | 247 | Ti | 233 |
| 7. | Ti | 725 | Mo | 1507 | Ta | 147 | Zr | 210 | Graphite | 70 |
| 8. | Ta | 156 | Ta | 601 | Co | 78 | Ta | 202 | Ta | 42 |
| 9. | Mo | 101 | Ti | 478 | SS$^b$ | 65 | Steel$^a$ | 140 | Mo | 41 |
| 10. | Graphite | 101 | Graphite | 187 | Ni | 0 | Mo | 123 | Zr | 22 |

$^a$AISI 1020 Steel
$^b$AISI 304 Stainless Steel

Table III

| Material | Hot Zone (604° C.) | Cold Zone (454° C.) |
|---|---|---|
| Ni | 10339 | 7099 |
| Inconel 750 (73% Ni) | 4692 | 3771 |
| Inconel 600 (76% Ni) | 4215 | 3448 |
| Inconel 625 (61% Ni) | 1630 | 453 |
| Inconel 718 (53% Ni) | 1212 | 437 |
| Nimonic PE-16 (43% Ni) | 365 | 201 |
| Mn/Co Alloy | 1532 | 2018 |
| Cobalt | 1867 | 2165 |
| Tantalum | 6 | 528 |
| Tungsten | 4 | 1036 |

Scanning electronmicroscopy and auger electron spectroscopy (AES) analysis studies of nickel material that has been exposed for a period of 1,000 hours have been conducted. The scanning electron microscope shows a significant build-up of material on 1,000 hour nickel getter specimens and a measurable manganese peak. AES analysis shows manganese in the same nickel specimen to have a relatively stable concentration to a depth of 800 angstroms and then slowly decreasing. At 12,000 angstroms the concentration had decreased by 67 percent but manganese was still present at 32,000 anstroms or 3.2 microns. The manganese concentration of the surface was 31 times the manganese content of unexposed metal. The existence of excess manganese well below the nickel surface indicated that manganese is diffusing inward, vastly increasing the activity takeup limit.

A nickel nuclide trap was fabricated to be positioned above the fuel zone in liquid metal fast breeder reactor fuel element subassemblies. This trap was made of 0.13 mm nickel sheet wound on a central 304 stainless steel mandrel, the sheet forming a plurality of layers about said mandrel and the spacing between layers being provided by twisted pairs of 0.25 mm nickel wire appropriately connected, joined, or welded to the nickel sheet at suitable intervals such as about 3.18 mm intervals. After exposure for 3,000 hours, the total loop activity was estimated at $9.7 \times 10^7$ disintegrations per minute for manganese-54, with $8.5 \times 10^7$ disintegrations per minute for manganese-54 located in the trap. Thus the trap was 88.6 percent effective for this radionuclide. Analysis of the trap indicated high activity at the inlet end of the trap for both manganese-54 and cobalt-60 radionuclides. It has been found that there is maximum deposition at points of increased turbulence where sodium leaves one segment or enters another, or under similiar conditions. The trap that gave this result had about 0.15 square meter of surface area and the sodium flow was directed in fifty five-3.18 mm by 0.5 mm deep parallel channels having an effective surface path length for deposition of the radionuclides of about 0.48 m.

Figure 2:
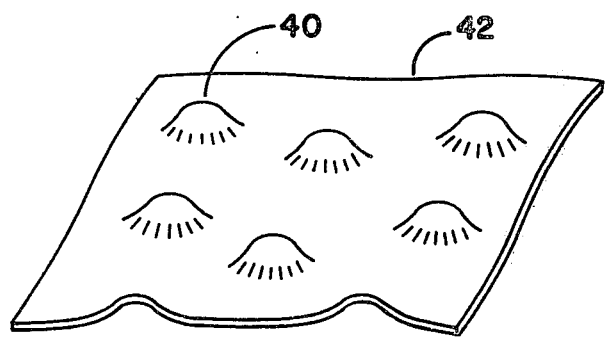
FIG. 2 illustrates one geometry of a trap material that may be useful in this invention.

Another radionuclide trap was fabricated of 0.13 mm thick mild steel (AISI 1020) sheet, dimpled in a random pattern with indentations of about 0.51 mm depth, as indicated by indentations 40 on sheet 42 in FIG. 2. This sheet, again rolled around a 9.6 mm diameter 460.8 mm length mandrel, provided a 0.14 square meter surface area trap 0.48 meter long with a 0.51 mm channel between layers. After 3,000 hours at about 604° C., there was some manganese-54 deposition on the steel trap as well as some cobalt-60 deposition. The same trap configuration using nickel as the sheet material resulted in much greater manganese-54 and cobalt radionuclide deposition.

Figure 3:
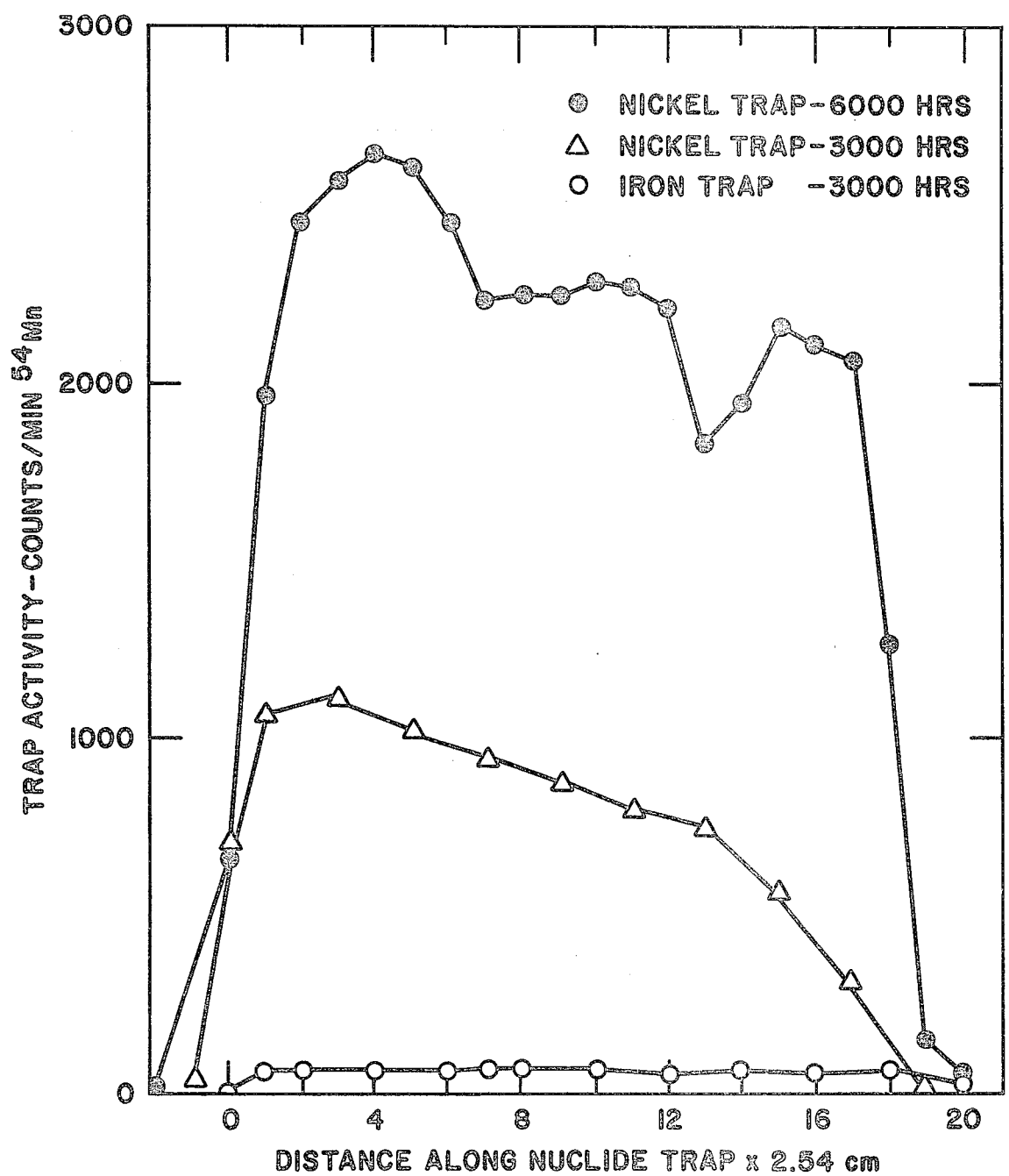
FIG. 3 plots the manganese-54 activity along the length of a nuclide trap made of nickel and along the length of a nuclide trap made of commercial AISI 1020 steel material.

FIG. 3 illustrates the activity in counts per minute of manganese-54 along the length of several nuclide traps, such that a comparison of the gettering efficiency for nickel versus iron as a function of distance along the trap may be achieved. The nickel nuclide trap is far more efficient for manganese-54 than the steel trap.

Figure 4:
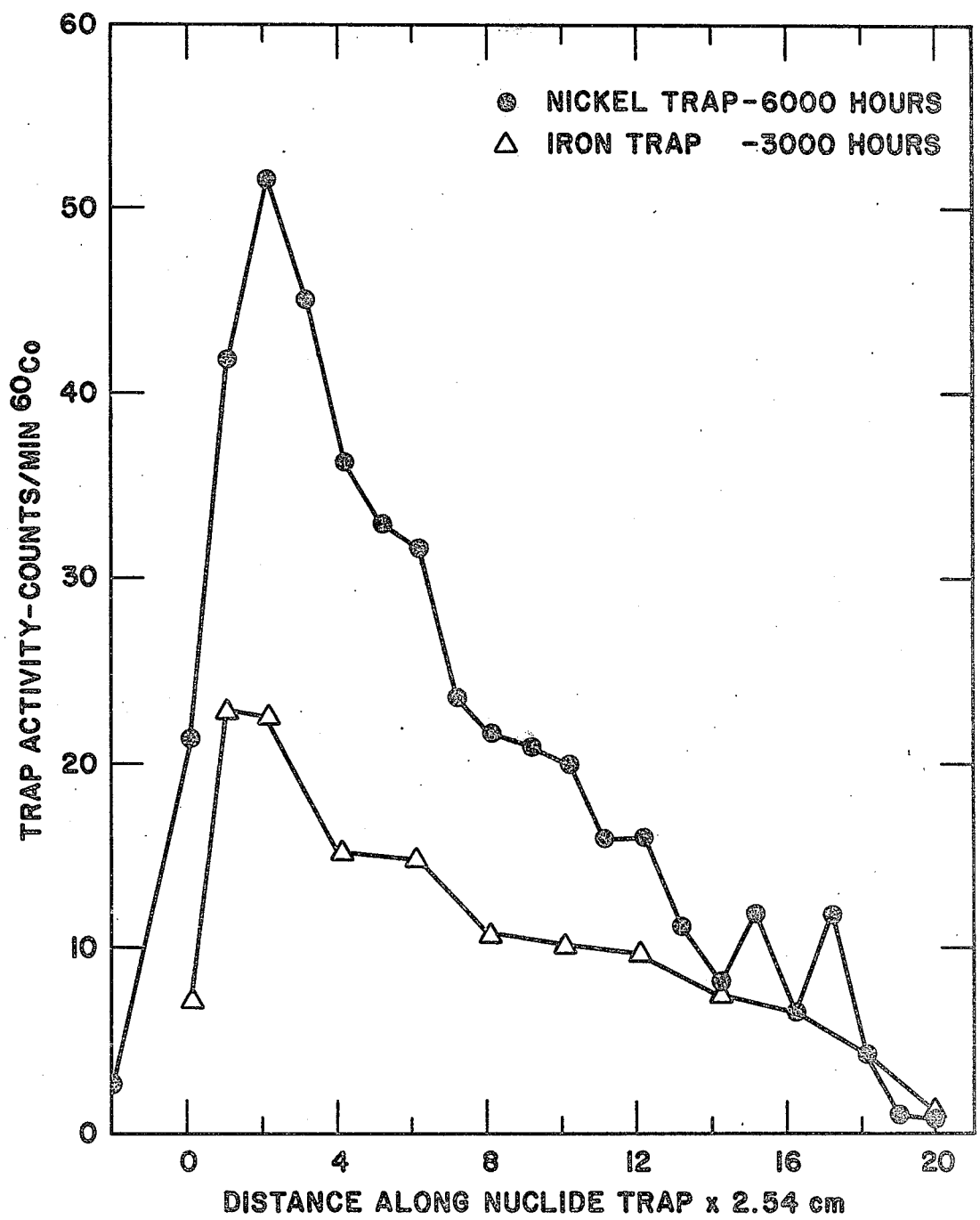
FIG. 4 compares cobalt-60 activity distribution on traps of nickel and commercial AISI 1020 steel.

From FIGS. 3 and 4, it is seen that the nickel trap is efficient at removing radionuclides from flowing sodium and that nickel is far superior to mild steel as a trap material for manganese-54 and is measurably superior for cobalt-60.

Figure 5:
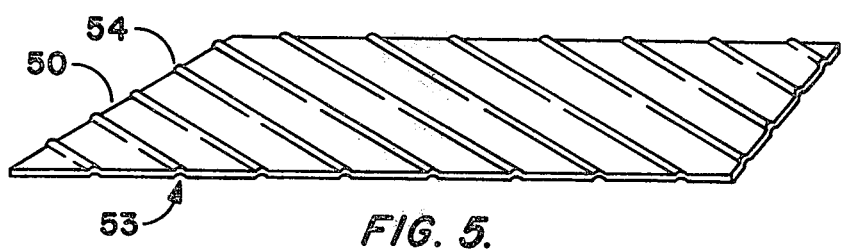
FIG. 5 illustrates an alternate geometry of a radionuclide attracting material useful for an apparatus of this invention.
Figure 6:
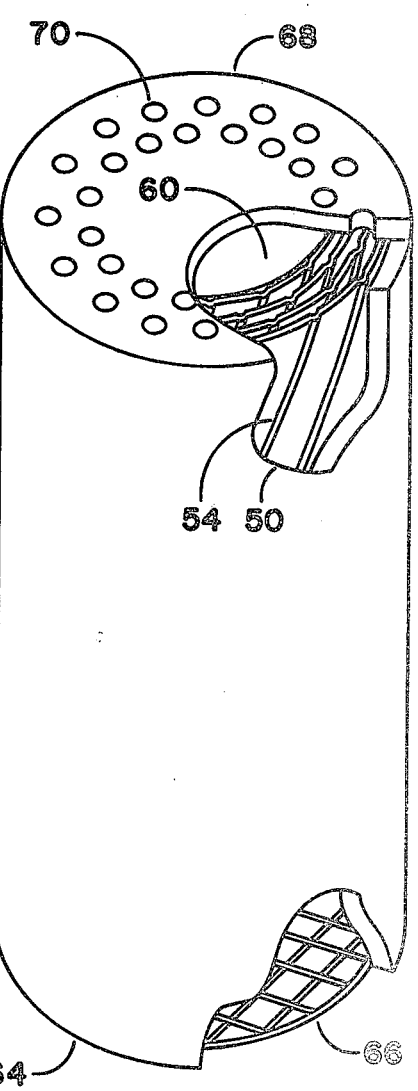
FIG. 6 illustrates an embodiment that may be used for practicing this invention.

FIG. 5 illustrates a sheet form that may provide an increased flowpath along a minimal trap flow distance. The generally rectangular nickel sheet 50 may have a plurality of generally parallel, diagonally disposed grooves 53 on a surface thereof spaced at suitable distance apart such as about 0.25 mm deep and 6.35 mm apart. The interlayer spacing is provide by the elongated, raised portion 54 on the opposite surface of the sheet, which portions 54 are coextensive with the parallel grooves, as the sheet is rolled about a mandrel 60, made of such as 304L stainless steel, which forms the central core of nuclide trap 62 shown in FIG. 6. As the sheet 50 is rolled to make a trap segment, the grooves form a set of elongated arcuate parallel spiral paths or helical paths or passageways for the sodium flow. These can be varied in length per unit trap length by varying the angle of the original diagonal grooves 53. The trap therefore is the nickel sheet being convoluted about said center support member in a spiral member effectively forming a plurality of concentric sheet layers about the support member, the raised portions 54 of the nickel sheet separating adjacent sheet layers and forming elongated arcuate helical passageways between the adjacent sheet layers and adjacent raised portions for passage of the coolant past the convoluted nickel sheet in turbulent fashion through the passageways and effect chemical deposition of the radionuclides on the sheet surfaces. After the sheet 50 is wound around the mandrel 60, it may be contained or housed within a suitable housing 64 of appropriate configuration, the housing having a perforate bottom or screened end 66 to permit passage of the liquid sodium into and through the grooved 53 material. Housing 64 likewise has an upper cover portion 68 having perforations 70 or openings therethrough to permit outflow of the liquid sodium from the trap while retaining the trap material in position. The housing may concentrically encase the convoluted sheet and the support member. The end portions 66, 68 of the convoluted nickel sheet may be disposed in the path of the liquid coolant stream to effect flow of the coolant longitudinally of said convolutions, the housing retaining the convoluted sheet disposed longitudinally in the liquid coolant stream, i.e., the axis of the center support member being parallel to the stream flow, and the end portions of the nickel sheet are disposed transverse to the liquid coolant stream flow.

Figure 7:
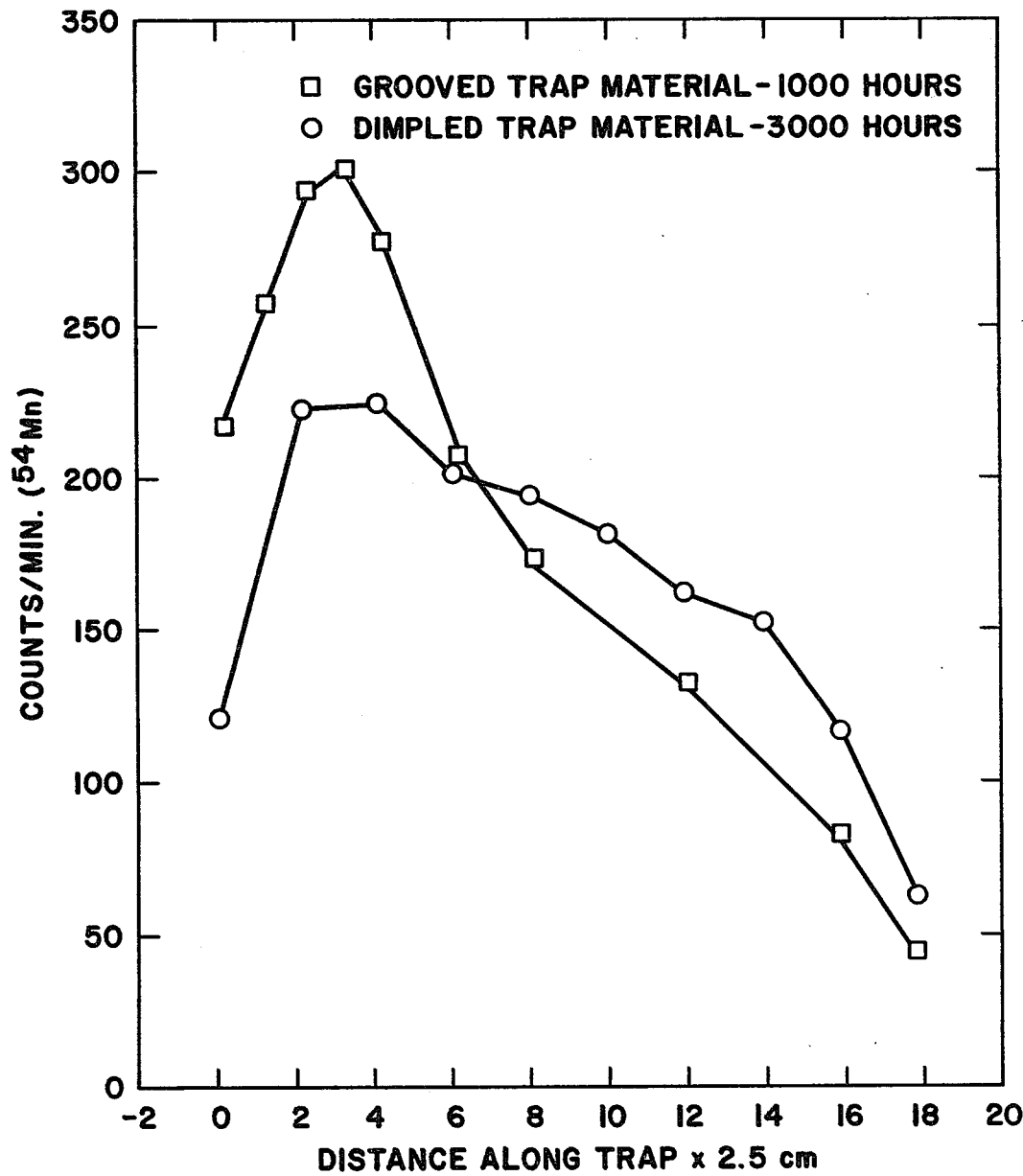
FIG. 7 plots the activity distribution of traps having the nickel trap material configuration of FIG. 2 and traps having nickel trap material configuration of FIG. 5.

FIG. 7 compares the results of a trap having getter material configuration shown in FIG. 5 and one having the getter material configuration shown in FIG. 2. The radioactivity profile indicates a peak at the upstream edge with a sharp decrease through the exit end of the trap, which is a favorable trap activity spread with peak activity at the leading edge and little activity or minimal activity at the exit. Quite obviously the manganese-54 trapping efficiency is much superior for the trap configuration of FIG. 6 which includes the trap material of FIG. 2.

By employing the teaching of this invention, the radionuclides manganese-54, cobalt-58 and cobalt-60 may be effectively controlled in the liquid sodium coolant loop such that undesired deposition of these radionuclides is averted by incorporating the teachings of this invention in the sodium loop, that is by controlling where the radionuclides deposit by employing a nickel getter material as a trap in the area of maximum radionuclide egress from the fuel system, and further by making the surfaces in contact with sodium upon which the radionuclides are not to be deposited as tungsten, molybdenum, or tantalum surfaces. These metals may be used to coat components upon which radionuclide deposition is undesirable, or the components may be made of these metals. While 75% trap removal efficiencies for radionuclides manganese-54, cobalt-58 and cobalt-60 are referred to herein, efficiencies of 95% or better have been achieved in various runs. Although AISI 1020 steel appeared sufficiently promising initially to warrant further testing, results obtained from exposure to flowing sodium proved that it was not satisfactorily accomplishing manganese-54 removal.

What is claimed is:

1. A method for controlling deposition onto component surfaces of radionuclides manganese-54, cobalt-58 and cobalt-60 from a liquid metal stream containing said radionuclides and contacting said component surfaces, comprising disposing a getter material in said liquid metal stream with surfaces of said getter material contacting said liquid metal stream to chemically getter said radionuclides onto said getter material, wherein said getter material comprises at least 73 weight percent nickel.

2. The method of claim 1 wherein said liquid metal stream containing said radionuclides comprises a nuclear reactor liquid metal coolant, and said radionuclides are released into said liquid metal stream from irradiation in said nuclear reactor.

3. The method of claim 2 further including disposing in said liquid metal stream a non-getter metal selected from the group consisting of tantalum, tungsten and molybdenum on said component surfaces that contact said liquid metal stream where deposition is not desired to inhibit chemical deposition of said radionuclides.

4. The method of claim 3 wherein said nuclear reactor liquid metal coolant is selected from the group consisting of sodium and lithium, said getter material comprises essentially 100 weight percent nickel, and said getter material comprises a high surface area disposed immediately downstream of said radionuclide source and in a form to effect turbulent contact of said stream with said getter material.

5. The method of claim 3 wherein said liquid metal stream comprises liquid sodium coolant for a nuclear reactor, and including inhibiting deposition of said radionuclides from said liquid molten sodium at at least about 75% efficiency, and, further, effecting deposition of said radionuclides onto said getter material at at least about 75% efficiency.

6. A method for inhibiting deposition of radionuclides manganese-54, cobalt-58, and cobalt-60 from a liquid metal stream onto component surfaces comprising disposing a non-getter material selected from the group consisting of tantalum, tungsten and molybdenum on said component surfaces contacting said liquid metal stream wherein said radionuclide deposition is undesired to inhibit deposition of said radionuclides from said stream onto said surface of said non-getter material.

7. A system for practicing the method of claim 1 for controlling deposition of radionuclides manganese-54, cobalt-58, and cobalt-60 onto component surfaces in contact with a liquid metal containing said radionuclides comprising a nuclear reactor liquid metal coolant circuit, a liquid metal stream containing said radionuclides contained within said coolant circuit, nuclear reactor heat transfer components housed within said coolant circuit and in contact with said liquid metal stream, a getter made of a material comprising at least about 73 weight percent nickel disposed in the path of said liquid metal stream within said coolant circuit with surfaces of said getter material contacting said liquid metal stream to effect chemical gettering of said radionuclides from said liquid metal stream onto said getter material surfaces.

8. The system of claim 7 further including said nuclear heat transfer component surfaces being non-getter surfaces selected from the group consisting of tantalum, tungsten, and molybdenum to inhibit deposition of said radionuclides onto said non-getter surfaces on said components.

9. The system of claim 7 wherein said liquid metal stream comprises a nuclear reactor liquid metal coolant selected from the group consisting of sodium and lithium.

10. The system of claim 9 wherein said liquid metal stream comprises a sodium metal coolant for a liquid metal fast breeder reactor, said getter is made of nickel, and said radionuclides are released into the liquid metal stream from reactor irradiation.

11. The system of claim 8 wherein said getter material is nickel.

12. The system of claim 11 wherein said getter material for gettering said radionuclides comprises a coating having a thickness of at least 25 microns, and said non-gettering material comprises a coating having a thickness of at least 25 microns.

13. A system for practicing the method of claim 6 for controlling deposition of radionuclides manganese-54, cobalt-58, and cobalt-60 onto component surfaces in contact with a liquid metal containing said radionuclides comprising a nuclear reactor liquid metal coolant circuit, said liquid metal disposed in said coolant circuit, nuclear reactor heat transfer components housed within said coolant circuit and in contact with said liquid metal and non-getter surfaces selected from the group consisting of tantalum, tungsten and molybdenum on said reactor heat transfer components in contact with said liquid metal wherein said deposition of said radionuclides is not desired, to effect passage of said liquid metal past said components having said non-getter surfaces and inhibit deposition of said radionuclides on said non-getter surfaces.

* * * * *